(12) United States Patent
Ho

(10) Patent No.: US 8,267,107 B2
(45) Date of Patent: Sep. 18, 2012

(54) VALVE WITH VENTING PORT

(75) Inventor: Thanh Ho, Brunswick, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 337 days.

(21) Appl. No.: 12/715,971

(22) Filed: Mar. 2, 2010

(65) Prior Publication Data
US 2011/0214746 A1    Sep. 8, 2011

(51) Int. Cl.
*F15B 13/042* (2006.01)
*F15B 13/04* (2006.01)

(52) U.S. Cl. .................. 137/1; 137/625.26; 137/625.27

(58) Field of Classification Search ......... 137/1, 625.26, 137/625.27, 625.66
See application file for complete search history.

(56) References Cited

U.S. PATENT DOCUMENTS

| | | | | |
|---|---|---|---|---|
| 3,042,072 | A * | 7/1962 | Humphrey et al. | 137/625.27 |
| 3,208,720 | A * | 9/1965 | Huntington | 137/625.27 |
| 4,128,110 | A * | 12/1978 | Haytayan | 137/625.27 |
| 4,223,953 | A * | 9/1980 | Cruse | 303/2 |
| 4,895,654 | A * | 1/1990 | Burrows | 137/625.27 |
| 6,375,154 | B1 * | 4/2002 | Kussel et al. | 137/625.26 |
| 7,571,738 | B2 | 8/2009 | Ho et al. | |
| 2009/0045671 | A1 | 2/2009 | Ho | |

OTHER PUBLICATIONS

Bendix Service Data Sheet SD-03-3655, TP-5 Tractor Protection Valve, BW1575, Jun. 2007.
Bendix Service Data Sheet SD-03-3656, TP-3DC Tractor Protection Valve With Double Check, BW1760, Jun. 2007.

* cited by examiner

*Primary Examiner* — John Rivell
(74) *Attorney, Agent, or Firm* — Calfee, Halter & Griswold LLP

(57) ABSTRACT

A valve includes a valve housing. A bore is in the valve housing. An inlet supply port fluidly communicates a pressurized supply fluid to the bore. A piston is movably positioned in the bore based on the pressure of the supply fluid. A portion of the piston extends into a frusto-conically shaped portion of the bore. A sealing member is associated with the portion of the piston sealingly engaging a surface of the frusto-conically shaped portion of the bore based on the pressure of the supply fluid. An inlet valve, movably positioned in the bore, is biased to sealingly engage a wall of the bore based on the pressure of the supply fluid. A control pressure supply port fluidly communicates a pressurized control fluid to the bore through the valve housing. A control pressure delivery port fluidly communicates with the control pressure supply port, via the bore, based on the pressure of the supply fluid. A venting port fluidly communicates with the control pressure delivery port, via the bore, based on the pressure of the supply fluid.

20 Claims, 3 Drawing Sheets

VALVE WITH VENTING PORT

BACKGROUND

The present invention relates to a valve with a venting mechanism. It finds particular application in conjunction with a tractor protection valve for heavy vehicles and will be described with particular reference thereto. It will be appreciated, however, that the invention is also amenable to other applications.

Different types of heavy vehicles include straight vehicles (e.g., vehicles having a cargo body and a tractor mounted on the same chassis) and articulated vehicles (e.g., vehicles having a cargo body and a tractor mounted on different chassis). Articulated heavy vehicles typically include a tractor portion and a trailer portion. Many common vehicle systems on the tractor and the trailer portions require fluid (e.g., compressed air or pneumatic fluid) to operate. Connecting lines between the tractor and the trailer communicate the fluid between the tractor and trailer portions for operating the various vehicle systems. For example, a supply connecting line transmits pressurized fluid (e.g., compressed air) from the tractor to the trailer for use as supply pressure by a trailer brake system; a control connecting line transmits pressurized fluid (e.g., compressed air) from the tractor to a control volume on the trailer for use as control pressure by service brakes on the trailer. In this design, a pressure signal is supplied via the control connecting line to apply the trailer service brakes when a vehicle operator depresses a brake pedal on the tractor.

The connecting lines are typically connected to a valve (e.g., a tractor protection valve), which is mounted on the tractor, through which the fluid is communicated between the tractor and trailer portions of the vehicle. In the event of a leak in the vehicle air system or one of the connecting lines, or if one of the connecting lines become separated from either the trailer or the tractor protection valve, the fluid may leak at a rapid rate (e.g., compressed air intended for the trailer brake system may, instead, be rapidly vented to atmosphere). In this case, the tractor protection valve will operate to reduce or prevent the unintended leakage of the fluid. For example, if the trailer becomes separated from the tractor, the tractor protection valve prevents or reduces the loss of pressure on the tractor so that the tractor (and the tractor braking system) can continue to operate safely. Trailers typically include parking brakes (spring brakes) that are automatically applied if the supply pressure to the trailer is lost.

If the pressure of the trailer supply air, which is provided from the tractor protection valve to the trailer via the supply connecting line, drops below a predetermined threshold (e.g., if a leak develops in the air supply system, or if the supply connecting line is disconnected from either the tractor protection valve or the trailer), a valve on the tractor protection valve closes to prevent pressurized fluid being supplied to the control volume on the trailer. Closing the valve on the tractor protection valve to prevent pressurized fluid from being supplied to the control volume on the trailer may cause pressurized air to become trapped in the control volume, which may cause the trailer service brakes to be applied. As discussed above, once the trailer supply air pressure is below the predetermined threshold, the trailer parking brakes may be applied. Simultaneous application of the service brakes and the parking brakes on, for example, the trailer is commonly referred to as service brake and spring brake compounding. Service brake and spring brake compounding on, for example, the trailer is undesirable. Therefore, in order to prevent service and spring brake compounding on the trailer, air trapped in the control volume is typically vented to atmosphere when the parking brakes are applied.

It is desired to reduce the complexity and manufacturing costs associated with current tractor protection valve designs while ensuring the service brake control volume is vented when trailer supply pressure to the tractor protection valve drops below the predetermined threshold.

The present invention provides a new and improved apparatus and method which addresses the above-referenced problems.

SUMMARY

In one aspect of the present invention, a valve includes a valve housing. A bore is in the valve housing. An inlet supply port fluidly communicates a pressurized supply fluid to the bore. A piston is movably positioned in the bore based on the pressure of the supply fluid. A portion of the piston extends into a frusto-conically shaped portion of the bore. A sealing member is associated with the portion of the piston sealingly engaging a surface of the frusto-conically shaped portion of the bore based on the pressure of the supply fluid. An inlet valve, movably positioned in the bore, is biased to sealingly engage a wall of the bore based on the pressure of the supply fluid. A control pressure supply port fluidly communicates a pressurized control fluid to the bore through the valve housing. A control pressure delivery port fluidly communicates with the control pressure supply port, via the bore, based on the pressure of the supply fluid. A venting port fluidly communicates with the control pressure delivery port, via the bore, based on the pressure of the supply fluid.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
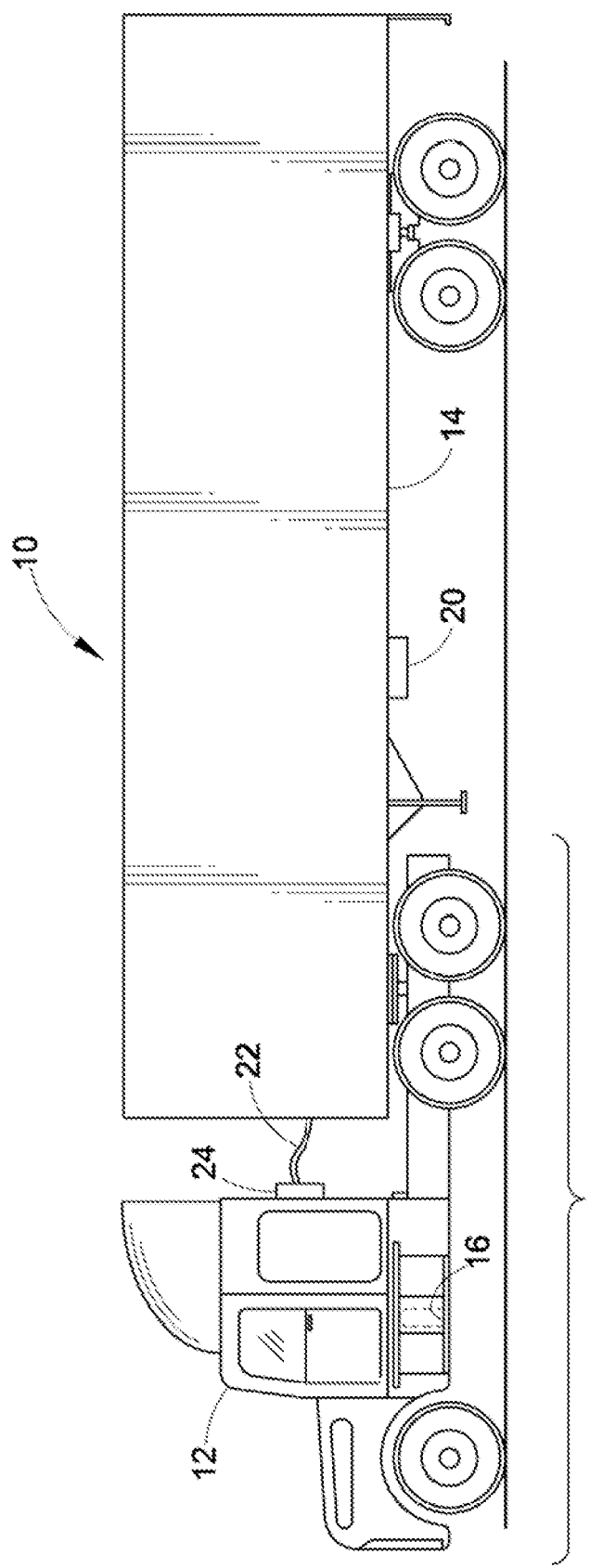
FIG. 1 illustrates a vehicle including a valve in accordance with one embodiment of an apparatus illustrating principles of the present invention.

With reference to FIG. 1, a heavy vehicle 10 (e.g., an articulated vehicle) includes a tractor portion 12 (a first portion) and a trailer portion 14 (a second portion). A compressor 16 on the tractor portion 12 produces a compressed fluid that is used by a vehicle air system 20 (e.g., a brake system) on, for example, the trailer portion 14. One or more connecting lines 22 pass the compressed fluid from the tractor portion 12 to the trailer portion 14. A valve 24 (e.g., a tractor protection valve) is mounted on the tractor portion, and the connecting lines are secured to the valve 24.

Figure 2:
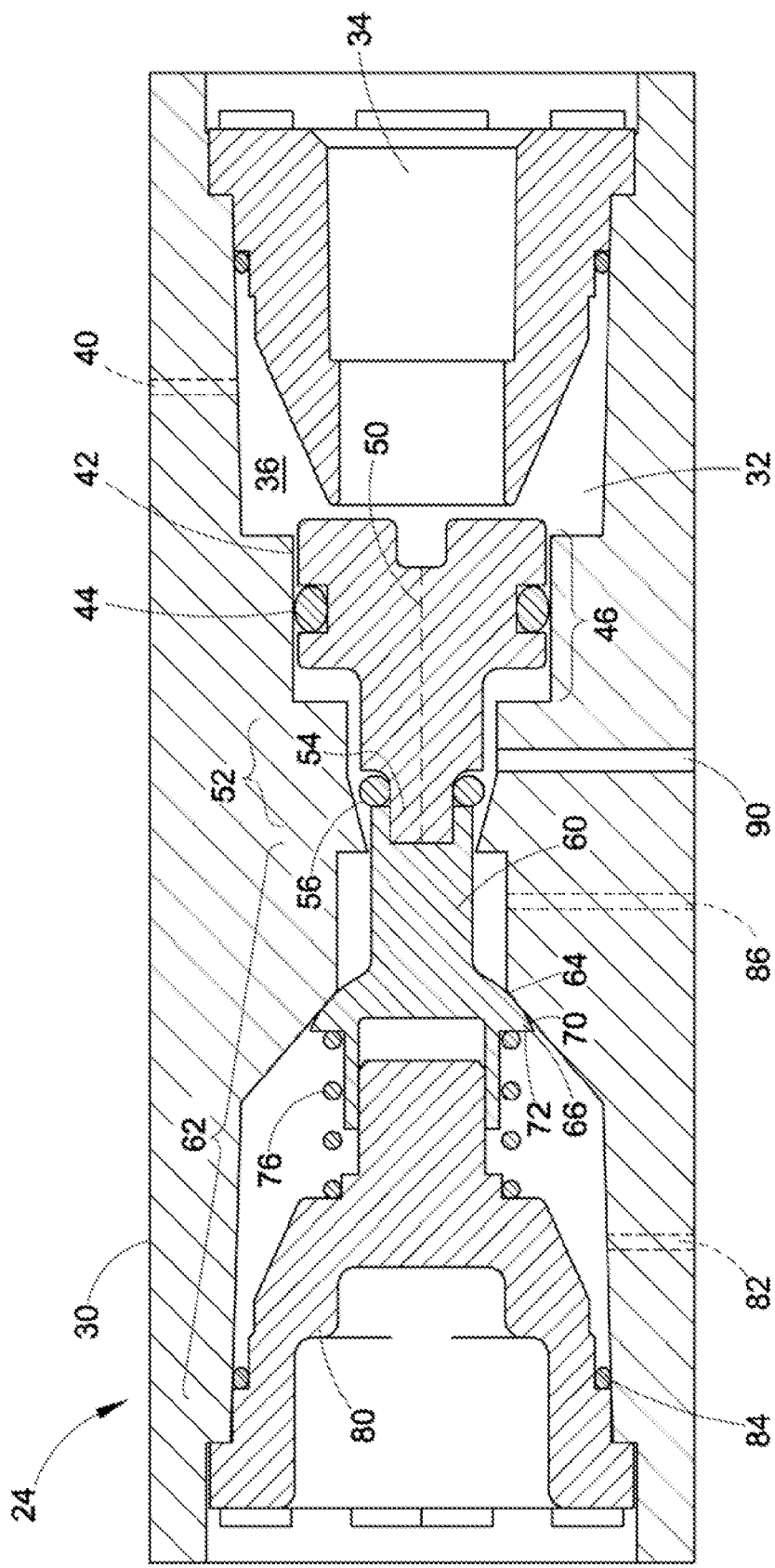
FIG. 2 illustrates a schematic representation of a valve in a first state in accordance with one embodiment of an apparatus illustrating principles of the present invention.
Figure 3:
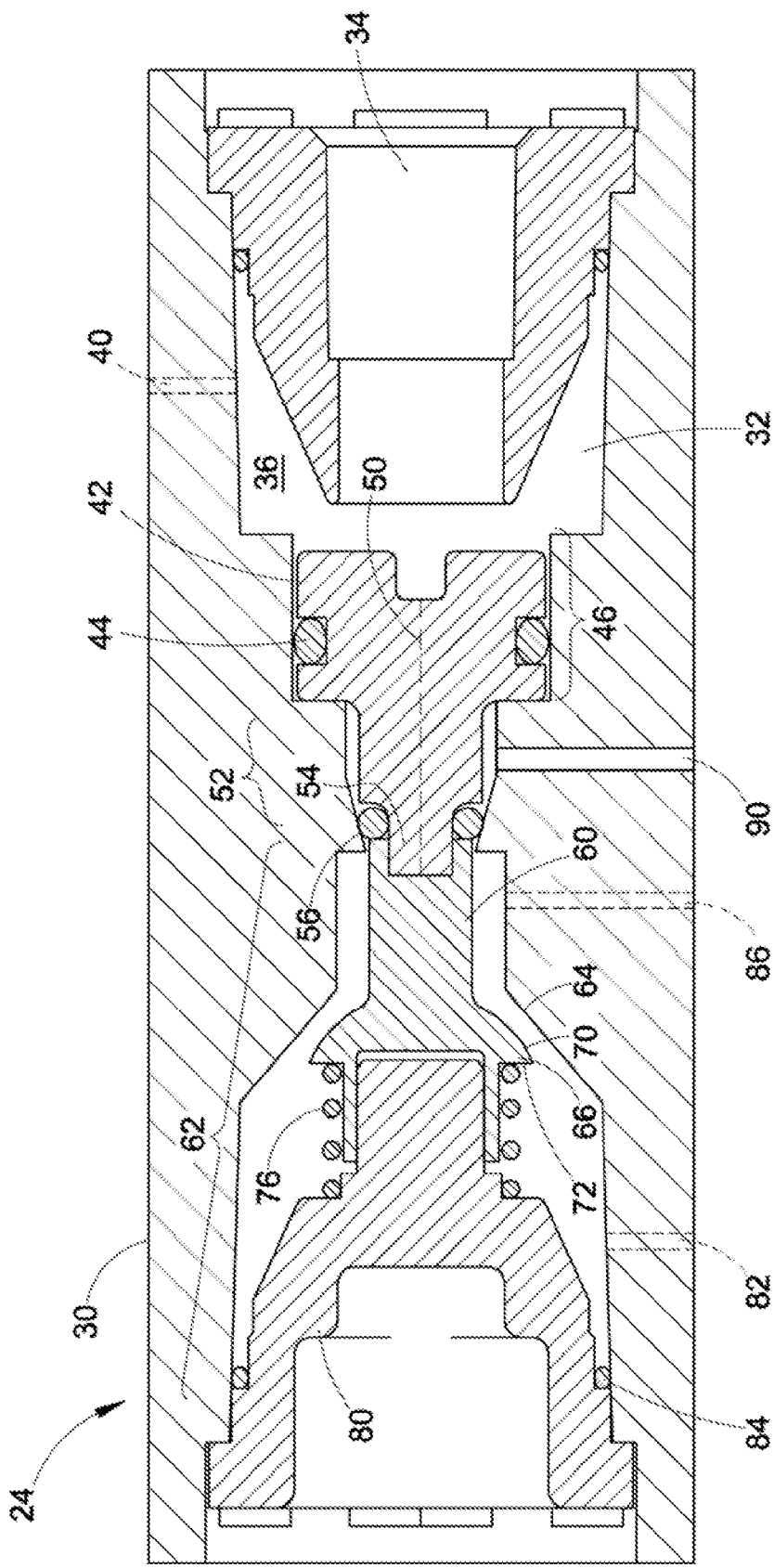
FIG. 3 illustrates a schematic representation of the valve of FIG. 2 in a second state in accordance with one embodiment of an apparatus illustrating principles of the present invention.

With reference to FIG. 2, an engineering schematic representation of the exemplary valve 24 (e.g., a tractor protection valve) is illustrated in a first state of operation in accordance with one embodiment of the present invention. With reference to FIG. 3, an engineering schematic representation of the exemplary valve 24 is illustrated in a second state of operation in accordance with one embodiment of the present invention.

With reference to FIGS. 2 and 3, the valve 24 includes a valve housing 30. A bore 32 is included in the housing 30. An inlet supply port 34 is included in the valve housing 30. A pressurized supply fluid (e.g., compressed air) received at the inlet supply port 34 (from, for example, the compressor 16 and connecting lines 22 illustrated in FIG. 1) is communicated to a supply portion 36 of the bore 32 via the inlet supply port 34.

An outlet supply port 40 is also included in the valve housing 30. The pressurized compressed air in the supply portion 36 of the bore 32 is communicated to the vehicle system 20 (see FIG. 1), which is operated by compressed air, via the outlet supply port 40.

A piston 42 (plunger) is movably positioned in the bore 32. In one embodiment, a first sealing member 44 sealingly engages a wall of a first portion 46 of the bore 32 having a surface that is substantially parallel to a longitudinal axis 50 of the piston 42. The seal created by the first sealing member 44 substantially prevents any of the compressed air entering the inlet supply port 34 from passing the first sealing member 44. In other words, substantially all of the compressed air entering the supply portion 36 of the bore 32 is fluidly communicated to the vehicle system 20 (see FIG. 1) on, for example, the trailer 14 (see FIG. 1). As discussed in more detail below, the position of the piston 42 in the bore 32 is based on a pressure of the compressed air in the supply portion 36 of the bore 32.

A second portion 52 of the bore 32 includes a frusto-conical shaped surface. In one embodiment, the frusto-conical shaped surface is angled at about 15 degrees±0.5 degrees with respect to the longitudinal axis 50 of the piston 42. An extended portion 54 of the piston 42 extends into the second portion 52 of the bore 32. A second sealing member 56 associated with the extended portion 54 of the piston 42 (e.g., an o-ring around the extended portion 54 of the piston 42) sealingly engages a frusto-conically shaped surface of the second portion 52 of the bore 32 based on the pressure of the compressed air in the supply portion 36 of the bore 32 and/or a position of the piston 42 in the bore 32.

An inlet valve 60 is movably positioned in a third portion 62 the bore 32. In one embodiment, the inlet valve 60 contacts, and moves with, the piston 42. In the illustrated embodiment, a portion of the extended portion 54 of the piston 42 extends into the third portion 62 of the bore 32. The third portion 62 of the bore 32 is designed to include an angled wall defining a vertex 64 that acts as an inlet valve seat.

The inlet valve 60 includes a shoulder 66 having first and second faces 70, 72, respectively. In the illustrated embodiment, the first face 70 of the shoulder 66 includes a spherical shape, and the second face 72 of the shoulder 66 includes a substantially flat surface. A first end of a biasing member 76 (e.g., a spring) abuts a cap 80, which is fixedly secured in the bore 32, and a second end of the biasing member 76 abuts the substantially flat surface of the second face 72 of the shoulder 66. The biasing member 76 biases the inlet valve 60 to sealingly engage the wall of the bore 32. More specifically, the biasing member 76 biases the shoulder 66 so that the spherically-shaped first face 70 sealingly engages the inlet valve seat 64. As discussed in more detail below, the biasing member 76 biases the spherically-shaped first face 70 to sealingly engage the inlet valve seat 64 based on the pressure of the compressed air in the supply portion 36 of the bore 32.

In one embodiment, the shoulder 66 of the inlet valve 60 includes a plastic material, which facilitates sealing between the first face 70 and the inlet valve seat 64 without using a rubber seal. However, other embodiments, in which the shoulder 66 includes any other material such as rubber, are also contemplated.

A control pressure supply port 82 fluidly communicates with the third portion 62 of the bore 32, between the inlet valve seat 64 and a third sealing member 84 between the cap 80 and the wall of the bore 32, through the valve housing 30. The control pressure supply port 82 receives a fluid control signal (e.g., a compressed air signal). In one embodiment, it is contemplated that the fluid control signal is generated based on an amount a service brake pedal in the tractor 12 is depressed. For example, the fluid control signal received at the control pressure supply port 82 is substantially zero (0) psi when the brake pedal is not depressed; and the fluid control signal received at the control pressure supply port 82 is about 120 psi when the brake pedal is fully depressed. The fluid control signal is fluidly communicated to the third portion 62 of the bore 32 via the control pressure supply port 82.

A control pressure delivery port 86 fluidly communicates with the third portion 62 of the bore 32, between the inlet valve seat 64 and the second portion 52 of the bore 32, through the valve housing 30.

A venting port 90 fluidly communicates with the second portion 52 of the bore 32 and, in one embodiment, atmosphere. However, other embodiments, in which the venting port 90 fluidly communicates with, for example, a venting volume instead of atmosphere, are also contemplated.

With reference to FIG. 2, the valve 24 is illustrated in the first state when the pressure of the compressed fluid in the supply portion 36 of the bore 32 is below a first predetermined pressure threshold (e.g., less than 20 psi). For example, the valve 24 is in this position if the vehicle has been powered-down at the end of a day or if a leak has developed in the supply line on the trailer 14. In the first state, the biasing member moves the inlet valve 60 to a first position in the bore 32 where the first face 70 of the inlet valve shoulder 66 sealingly engages the inlet seat 64. While in the first position, the inlet valve 60 positions the piston 42 in a respective first position in the bore 32 so that the second sealing member 56 does not sealingly engage the frusto-conically shaped surface of the second portion 52 of the bore 32.

Because the first face 70 of the inlet valve shoulder 66 sealingly engages the inlet seat 64, the control pressure supply port 82 does not fluidly communicate with the control pressure delivery port 86. At the same time, because the second sealing member 56 is not sealingly engaged with the surface of the second portion 52 of the bore 32, the control pressure delivery port 86 fluidly communicates with the venting port 90. The seal between the first face 70 of the inlet valve shoulder 66 and the inlet seat 64 prevents the control pressure supply port 82 from fluidly communicating with the venting port 90. In this state, any pressure at the control pressure delivery port 86 is fluidly communicated (vented) to atmosphere via the venting port 90.

When the pressure in the supply portion 36 of the bore 32 is below the first predetermined threshold, it is to be understood that parking brakes (spring brakes) on the trailer portion 14 of the vehicle 10 are applied. Service brake and spring brake compounding is undesirable. Since the control pressure delivery port 86 is vented to atmosphere when the pressure in the supply portion 36 of the bore 32 is below the first predetermined threshold, service brake and spring brake compounding is avoided.

With reference to FIGS. 2 and 3, as pressure builds in the supply portion 36 of the bore 32, the piston 42 and the inlet valve 60 begin to move away from the inlet supply port 34 and toward the cap 80. When the pressure in the supply portion 36 of the bore 32 becomes above a second predetermined threshold pressure (e.g., above about 35 psi±10 psi), the first face 70 of the inlet valve shoulder 66 becomes unsealed from the inlet seat 64. In one embodiment, shortly after the first face 70 becomes unsealed from the inlet seat 64, the piston 42 is positioned in the bore 32 so that the extended portion 54 is at a second position within the frusto-conically shaped second portion 52 of the bore 32. When the extended portion 54 is at the second position in the second portion 52, the second sealing member 56 sealingly engages the wall of the second portion 52. In an alternate embodiment, the extended portion 54 is moved to the second position within the frusto-conically shaped second portion 52 of the bore 32 (and the second sealing member 56 sealingly engages the wall of the second portion 52 of the bore 32) at the same time (e.g., simultaneously) when the first face 70 of the inlet valve shoulder 66 becomes unsealed from the inlet seat 64. When the second sealing member 56 sealingly engages the wall of the second portion 52, and when the first face 70 of the inlet valve shoulder 66 becomes unsealed from the inlet seat 64, the valve is in the second state of operation.

As illustrated in FIG. 3, when the valve 24 in the second state the control pressure supply port 82 fluidly communicates with the control pressure delivery port 86. At the same time, because the second sealing member 56 is sealingly engaged with the surface of the second portion 52 of the bore 32, neither the control pressure supply port 82 nor the control pressure delivery port 86 fluidly communicates with the venting port 90. In this second state, any pressure at the control pressure supply port 82 is fluidly communicated to the control pressure delivery port 86.

The first face 70 of the inlet valve shoulder 66 remains unsealed from the inlet seat 64, and the extended portion 54 remains at the second position within the frusto-conically shaped second portion 52 of the bore 32 (so that the second sealing member 56 remains sealingly engaged with the wall of the second portion 52), until the pressure in the supply portion 36 of the bore 32 drops below the first predetermined threshold pressure. In one embodiment, when the pressure in the supply portion 36 of the bore 32 drops below the first predetermined threshold pressure, the second sealing member 56 becomes unsealed from the wall of the second portion 52, and, shortly thereafter, the first face 70 of the inlet valve shoulder 66 (again) sealingly engages the inlet seat 64, In an alternate embodiment, when the pressure in the supply portion 36 of the bore 32 drops below the first predetermined threshold pressure, the second sealing member 56 becomes unsealed from the wall of the second portion 52 while, at the same time (simultaneously), the first face 70 of the inlet valve shoulder 66 (again) sealingly engages the inlet seat 64, In one embodiment, the second sealing member 56 (o-ring) is sized to maintain the sealing engagement with the wall of the frusto-conically shaped second portion 52 of the bore 32 when, for example, the control pressure passing from the control pressure supply port 82 to the control pressure delivery port 86 is about 120 psi. In this regard, it is contemplated that a cross-section of the o-ring is about 0.103".

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A valve, comprising:
a valve housing;
a bore in the valve housing;
an inlet supply port fluidly communicating a pressurized supply fluid to the bore;
a piston movably positioned in the bore based on the pressure of the supply fluid, a portion of the piston extending into a frusto-conically shaped portion of the bore, a sealing member associated with the portion of the piston sealingly engaging a surface of the frusto-conically shaped portion of the bore based on the pressure of the supply fluid;
an inlet valve, movably positioned in the bore, biased to sealingly engage a wall of the bore based on the pressure of the supply fluid;
a control pressure supply port fluidly communicating a pressurized control fluid to the bore through the valve housing;
a control pressure delivery port fluidly communicating with the control pressure supply port, via the bore, based on the pressure of the supply fluid; and
a venting port fluidly communicating with the control pressure delivery port, via the bore, based on the pressure of the supply fluid.

2. The valve as set forth in claim 1, wherein:
the surface of the frusto-conically shaped portion of the bore is angled at about 15 degrees±0.5 degrees relative to a longitudinal axis of the portion of the piston extending into the frusto-conically shaped portion of the bore.

3. The valve as set forth in claim 1, wherein:
the sealing member does not sealingly engage the surface of the frusto-conically shaped portion of the bore, and the inlet valve sealingly engages the wall of the bore, when the pressure of the supply fluid is below a first predetermined threshold;
the inlet valve is movably positioned against the bias to unseal from the wall of the bore when the pressure of the supply fluid is above a second predetermined threshold; and
the second predetermined threshold is greater than the first predetermined threshold.

4. The valve as set forth in claim 3, wherein:
the sealing member sealingly engages the surface of the frusto-conically shaped portion of the bore when the pressure of the supply fluid is above the second predetermined threshold.

5. The valve as set forth in claim 4, wherein:
the control pressure delivery port fluidly communicates with the control pressure supply port when the pressure of the supply fluid is above the second predetermined threshold.

6. The valve as set forth in claim 5, wherein:
the sealing member is an o-ring around the portion of the piston extending into the frusto-conically shaped portion of the bore; and
the o-ring is sized to maintain the sealing engagement with the surface of the frusto-conically shaped portion when the pressure of the supply fluid is above the second predetermined threshold.

7. The valve as set forth in claim 5, wherein:
the venting port fluidly communicates with the control pressure delivery port when the pressure of the supply fluid is less than the first predetermined threshold.

8. The valve as set forth in claim 1, wherein:
when the pressure of the supply fluid is below a first predetermined threshold, the sealing member does not sealingly engage the surface of the frusto-conically shaped portion of the bore, and the inlet valve sealingly engages the wall of the bore;
when the pressure of the supply fluid is above a second predetermined threshold, the inlet valve becomes unsealed from the wall of the bore before the sealing member sealingly engages the surface of the frusto-conically shaped portion of the bore;
the second predetermined threshold is greater than the first predetermined threshold; and
after the pressure of the supply fluid is above the second predetermined threshold and then drops below the first predetermined threshold, the inlet valve sealingly engages the wall of the bore, and the sealing member does not sealingly engage the surface of the frusto-conically shaped portion of the bore.

9. The valve as set forth in claim 8, wherein:
the inlet valve includes a shoulder having a first face with a spherical shape;
when the inlet valve sealingly engages the wall of the bore, the first face of the inlet valve is sealingly engaging the wall of the bore; and
the shoulder is a plastic material.

10. The valve as set forth in claim 8, further including:
a biasing member abutting a substantially flat second face of the shoulder.

11. A valve, comprising:
a valve housing;
a bore in the valve housing;
an inlet supply port fluidly communicating a pressurized supply fluid to the bore;
a piston, movably positioned in the bore based on the pressure of the supply fluid, a portion of the piston extending into a frusto-conically shaped portion of the bore, a sealing member on the portion of the piston sealingly engaging a surface of the frusto-conically shaped portion of the bore based on the position of the piston;
an inlet valve movably positioned in the bore and biased to sealingly engage a wall of the bore, the inlet valve becoming unsealed from the wall based on the position of the piston;
a control pressure supply port fluidly communicating a pressurized control fluid to the bore through the valve housing;
a control pressure delivery port fluidly communicating with the control pressure supply port, via the bore, based on the position of the inlet valve; and
a venting port fluidly communicating with the control pressure delivery port, via the bore, based on the position of the inlet valve.

12. The valve as set forth in claim 11, wherein:
the surface of the frusto-conically shaped portion of the bore is angled at about 15 degrees±0.5 degrees relative to a longitudinal axis of the portion of the piston extending into the frusto-conically shaped portion.

13. The valve as set forth in claim 11, wherein:
the sealing member does not sealingly engage the surface of the frusto-conically shaped portion of the bore, and the inlet valve sealingly engages the wall of the bore, when the pressure of the supply fluid is below a first predetermined pressure and the portion of the piston is at a first position in the frusto-conically shaped portion of the bore;
the inlet valve becomes unsealed from the wall of the bore when the pressure of the supply fluid is above a second predetermined pressure; and
the first predetermined pressure is less than the second predetermined pressure.

14. The valve as set forth in claim 13, wherein:
the sealing member sealingly engages the surface of the frusto-conically shaped portion of the bore when the pressure of the supply fluid is above the second predetermined pressure and the portion of the piston is at a second position in the frusto-conically shaped portion of the bore; and
the portion of the piston is positioned farther into the frusto-conically shaped portion at the second position relative to the first position.

15. The valve as set forth in claim 13, wherein when the pressure of the supply fluid, after having been higher than the second predetermined pressure, drops to less than the first predetermined pressure:
the portion of the piston returns to the first position in the frusto-conically shaped portion of the bore so that the sealing member does not sealingly engage the surface of the frusto-conically shaped portion;
the inlet valve returns to sealingly engage the wall of the bore; and
the venting port fluidly communicates with the control pressure delivery port and does not fluidly communicate with the control pressure supply port.

16. A method for controlling venting of a control pressure delivery port of a valve, the method comprising:
communicating a pressurized supply fluid to a bore of the valve;
movably positioning a piston in the bore based on the pressure of the supply fluid;
sealingly engaging/unengaging a sealing member, associated with a portion of the piston, with a surface of a frusto-conically shaped portion of the bore based on the pressure of the supply fluid;
movably positioning an inlet valve in the bore, the inlet valve being biased to sealingly engage a wall of the bore based on the pressure of the supply fluid;
communicating a pressurized control fluid to a supply port;
communicating the pressurized control fluid to a control pressure delivery port based on the pressure of the supply fluid; and
fluidly communicating the control pressure delivery port with a venting port based on the pressure of the supply fluid.

17. The method for controlling venting of a control pressure delivery port as set forth in claim 16, wherein the step of movably positioning the inlet valve in the bore includes:
movably positioning the inlet valve in the bore with the bias to sealingly engage the wall of the bore when the supply fluid is below a first predetermined pressure; and
moving the inlet valve against the bias to unseal the inlet valve from the wall when the supply fluid is above a second predetermined pressure, the second predetermined pressure being higher than the first predetermined pressure.

18. The method for controlling venting of a control pressure delivery port as set forth in claim 17, wherein the step of sealingly engaging/unengaging the sealing member includes:
unsealing the sealing member from the surface of the frusto-conically shaped portion of the bore when the supply fluid is below the first predetermined pressure; and sealingly engaging the sealing member with the surface of the frusto-conically shaped portion of the bore when the supply fluid is above the second predetermined pressure.

19. The method for controlling venting of a control pressure delivery port as set forth in claim 18, wherein the step of fluidly communicating the control pressure delivery port with the venting port includes:

after the supply fluid was above the second predetermined pressure and then drops below the first predetermined pressure, positioning the piston farther out of the frusto-conically shaped portion to unseal the sealing member from the frusto-conically shaped surface of the portion of the bore.

20. The method for controlling venting of a control pressure delivery port as set forth in claim 19, further including:

after the supply fluid was above the second predetermined pressure and then drops below the first predetermined pressure, moving the inlet valve with the bias to re-seal the inlet valve with the wall, to ensure the control pressure supply port does not fluidly communicate with the venting port while the control pressure delivery port fluidly communicates with the venting port.

* * * * *